Dec. 10, 1957  J. P. GUINANE  2,815,971
LOCKING DEVICES
Filed March 2, 1955
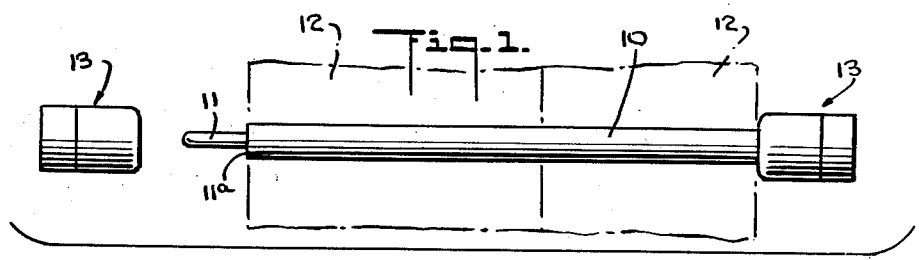
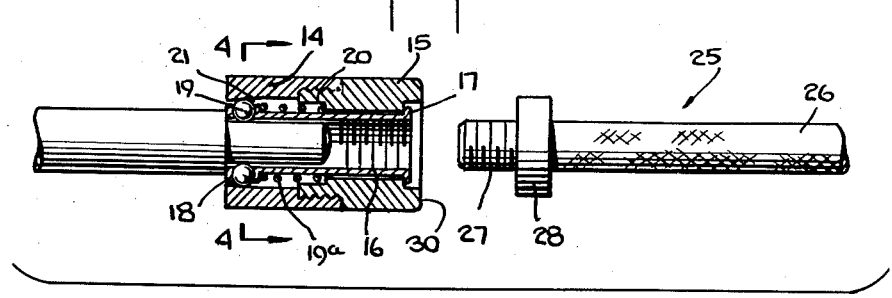
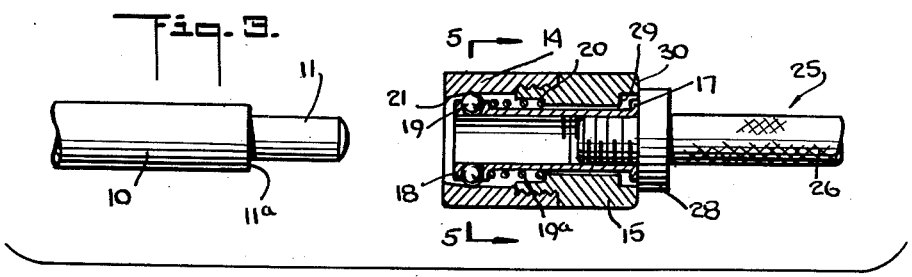
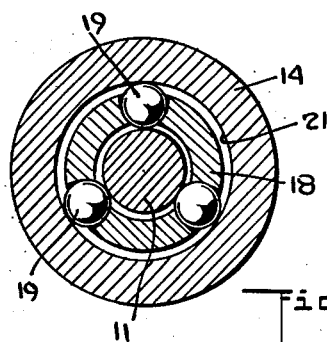
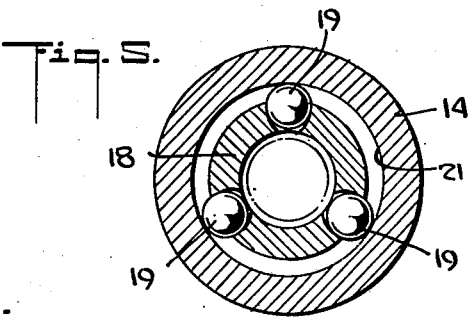
INVENTOR.
JAMES P. GUINANE
BY
S. Stephen Baker
ATTORNEY

United States Patent Office 2,815,971
Patented Dec. 10, 1957

2,815,971
LOCKING DEVICES

James P. Guinane, New York, N. Y., assignor, by mesne assignments, to Herculox Loose Leaf Corp., New York, N. Y., a corporation of New York Application March 2, 1955, Serial No. 491,685

3 Claims. (Cl. 287—53)

This invention relates to a locking device.

The invention is particularly directed to a device which can be locked to the end of a rod for the purpose of providing a form of nut therefor. Ordinarily, a nut is screwed to the end of a rod or bolt and it may serve as an enlargement or stop member. Of course, this requires the operation of screwing and unscrewing the nut and it is further subject to some objection in that the nut may loosen or fall off through vibration or the like. If the structure is in a public place, the nut may be removed by an unauthorized person and may result in theft of articles maintained by the structure.

With the foregoing in mind, I have devised a simple locking device for the end of a rod which serves as a stop member in the same manner as does a nut but which need not be screwed on. On the contrary, it is merely pushed or slid into a pre-determined, fixed position and it will hold in such position so that it cannot be removed except by a person equipped with a particular tool which renders its removal almost automatic. The action is simple, positive, and foolproof as will be shown hereinafter.

The invention will be further understood from the following description and drawings in which:

Figure 1 is an elevational view of a rod having the locking members on both ends thereof;

Figure 2 is a fragmentary exploded view of the locking member and the tool for removing it from the rod;

Figure 3 illustrates the removal of the locking member from the rod;

Figure 4 is an enlarged, cross-sectional view as taken along the line 4—4 of Figure 2; and Figure 5 is an enlarged, cross-sectional view as taken along the line 5—5 of Figure 3.

Rod 10 is an elongated metallic rod having reduced ends 11 defined by a shoulder 11a. The rod may be employed for an unlimited variety of purposes but in the present instance it is illustrated as supporting objects 12 which have a central opening through which the rod 10 may extend. Objects 12 may comprise telephone books or any other articles which are to be maintained on the rod. The locking members 13 are applied to the reduced ends 11 in order to lock the objects 12 on the rod against accidental displacement or unauthorized removal.

Locking members 13 take the form of a two-portion socket or casing comprising the lower wedge portion 14 and the upper head portion 15. Wedge portion 14 is screwed to head portion 15 to form a tubular casing within which is slidably and co-axially disposed ball carrier 16.

Ball carrier 16 is a tubular member having an upper outward flange 17 and an enlarged base 18, said base being formed with a plurality of openings in which are disposed a number of steel balls 19. The upper portion of the tubular ball carrier 16 is internally threaded. The enlarged base portion 18 of the ball carrier wall also serves as one terminal for a coil spring 19a which is disposed around the lower portion of ball carrier 16, the other terminal being formed by an internal shoulder 20 on the inner wall of head 15. It will be noted that the lower inner wall of member 14 is inclined inwardly to form a wedge 21.

The action of the locking member is as follows:

The spring 19a normally urges the ball carrier to a downward position toward said wedge portion 14 and it causes the balls 18 to be gripped by the wedge. If one attempts to pull outwardly upon the socket, the result is to make the grip between the shaft portion 11 and the wedge portion 14 tighter because the wider portion 21 of the wedge then presses against the steel balls which press inwardly against the shaft portion 11 thereby locking the members. Consequently, an attempt to remove the lock by pulling upon it merely tightens its grip. It may be stated the basic action of the device has been known in other environments. For example, reference may be made to United States Patent No. 1,869,790 for showing such basic action.

In order to remove the locking device from the rod, a special actuating tool 25 is provided. Tool 25 comprises shaft handle 26, a threaded end 27 and a radial enlargement 28 in the form of a collar adjacent the threaded portion. In order to remove the locking device, the user screws the threaded portion 27 into the upper threaded portion of the ball carrier 16. As the male element 27 is driven home, the enlargement 28 begins to press against the annular upper end face 30 of the head portion 15. Normally, the flange 17 of ball carrier 16 is recessed inwardly relative to the end face 30 of the head 15 as illustrated in Figure 2, such flange 17 resting on the internal shoulder 29 on the inner wall of head 15. However, when the enlargement 28 begins to press against the end face 30 of head portion 15 it depresses the same against the action of spring 19a and effectively draws up the balls 18 away from the wedge as illustrated in Figure 3. In other words, the flange 17 is brought up to the level of the end face 30 of head portion 15 as illustrated in Figure 3. Inasmuch as the wider portion 21 of the wedge no longer causes the balls 18 to be gripped against the shaft portion 11, the locking device may be easily removed therefrom.

It will be noted that the internal diameter of wedge portion 14 is greater than that of the main portion of rod 11. On the other hand, the internal diameter of ball carrier 16 is less than that of rod 11, bearing as it does on shoulder 11a. Accordingly, the enlargement 28 is free to press the casing forwardly over the rod 11 while the ball carrier is held in place thereby producing the required relative co-axial movement.

In Figure 4 is illustrated the normal position of the balls 18 where they serve as gripping means between the rod portion 11 and the wedge 14. On the other hand, when the ball carrier is elevated upwardly relative to the socket as illustrated in Figure 5, the balls 18 no longer grip the rod 11 and the device may be easily removed therefrom.

When the locking member is removed from the rod, the objects 12 maintained thereon may be removed or new objects may be substituted. The locking member is removed from the release tool 25 and may then be replaced upon the rod section 11 by simply sliding it on. The very act of sliding it on the rod tends to urge the balls 18 to a non-gripping position so that the application of the locking member to the rod is easily effected. Removal thereof, as has above been shown, is a simple and almost automatic process, merely necessitating the act of screwing the tool 25 into the locking member as above set forth.

There has been shown what is now considered a preferred embodiment of the invention but it is obvious that numerous changes and omissions may be made there without departing from its spirit.

What is claimed is:

1. The combination with an elongated rod having a shoulder and a reduced end extending therefrom, of a locking device therefor, said locking device comprising a hollow casing including a lower wedge portion having an internal diameter which is greater than that of the rod, a tubular ball carrier slidably disposed over said reduced end and having a diameter which is less than that of the rod, said casing and ball carrier being co-axial, a lower portion of the tubular wall of said ball carrier being formed with a plurality of openings, a ball in each of said openings and adapted to be urged inwardly of said tubular ball carrier by said lower wedge portion, a spring for urging said ball carrier downwardly toward said lower wedge portion while urging said casing upwardly so that said balls may normally be acted upon by said wedge portion, said ball carrier tubular wall having a lower annular end face which normally bears against said rod shoulder for limiting the inward movement of the ball carrier on said rod whereby said casing may be moved downwardly over said rod against the action of said spring and relative to said ball carrier during said normal position of said ball carrier annular end face for releasing the balls from the action of said lower wedge portion to enable the device to be withdrawn from said reduced end, the upper portion of said ball carrier being internally threaded whereby it may be engaged by a correspondingly threaded tool and raised upwardly against the action of said spring for releasing the balls from the action of said lower wedge portion, and said rod shoulder limiting movement of said reduced end so that it does not enter said internally threaded upper portion of said ball carrier so as to permit said engagement thereof by said correspondingly threaded tool.

2. The combination with an elongated rod having a shoulder and a reduced end extending therefrom, of a locking device therefor, said locking device comprising a hollow casing including a lower wedge portion having an internal diameter which is greater than that of the rod, a tubular ball carrier slidably disposed over said reduced end and having a diameter which is less than that of the rod, said casing and ball carrier being co-axial, a lower portion of the tubular wall of said ball carrier being formed with a plurality of openings, a ball in each of said openings and adapted to be urged inwardly of said tubular ball carrier by said lower wedge portion, a spring for urging said ball carrier downwardly toward said lower wedge portion while urging said casing upwardly so that said balls may normally be acted upon by said wedge portion, said ball carrier tubular wall having a lower annular end face which normally bears against said rod shoulder for limiting the inward movement of the ball carrier on said rod whereby said casing may be moved downwardly over said rod against the action of said spring and relative to said ball carrier during said normal position of said ball carrier annular end face for releasing the balls from the action of said lower wedge portion to enable the device to be withdrawn from said reduced end, the upper portion of said ball carrier being internally threaded and an actuating tool receivable in said threaded upper portion, said casing being formed with an upper annular end face which is forward of said threaded upper portion of said ball carrier and said tool being threaded to engage said threaded upper portion, and a radial enlargement on said tool following its threaded portion and adapted to press against said casing upper annular end face as said tool engages said threaded upper portion of the ball carrier whereby said enlargement will depress said casing relative to said ball carrier against the action of said spring during threading of said tool into said threaded upper portion, said rod shoulder limiting movement of said reduced end so that it cannot enter the said threaded upper portion of the ball carrier so that said actuating tool may be receivable in said threaded upper portion.

3. The combination with an elongated rod having a shoulder and a reduced end extending therefrom, of a locking device therefor, said locking device comprising a hollow casing having a lower wedge portion, a hollow tubular ball carrier slidably disposed over said reduced end and having a diameter which is less than that of the rod, said casing and ball carrier being co-axial, a lower portion of the tubular wall of said ball carrier being formed with a plurality of openings, a ball in each of said openings and adapted to be urged inwardly of said tubular ball carrier by said lower wedge portion, a spring for urging said ball carrier downwardly toward said lower wedge portion while urging said casing upwardly so that said balls may normally be acted upon by said wedge portion, said ball carrier tubular wall having a lower annular end face which normally bears against said rod shoulder for limiting the entrance of said rod reduced end into said ball carrier, so as to prevent said reduced end from entering the upper portion of said ball carrier, said upper portion of said ball carrier being internally threaded whereby it may be engaged by a correspondingly threaded tool and raised upwardly against the action of said spring for releasing the balls from the action of said lower wedge portion, the limitation of movement of said reduced end leaving said upper portion of said ball carrier free for engagement by said correspondingly threaded tool.

References Cited in the file of this patent

UNITED STATES PATENTS

| Number | Name | Date |
|---|---|---|
| 700,412 | Fischer | May 20, 1902 |
| 1,130,716 | Dressel | Mar. 9, 1915 |
| 1,246,329 | Solberg | Nov. 13, 1917 |
| 1,285,939 | Cherry | Nov. 26, 1918 |
| 1,299,745 | Ludlow | Apr. 8, 1919 |
| 1,632,249 | Steenrod | June 14, 1927 |
| 1,986,594 | Newland | Jan. 1, 1935 |
| 2,373,083 | Brewster | Apr. 3, 1945 |
| 2,515,807 | Spooner | July 18, 1950 |